United States Patent [19]
Nill et al.

[11] Patent Number: 5,464,970
[45] Date of Patent: Nov. 7, 1995

[54] MULTIPLE COUNTER ASSEMBLY

[75] Inventors: Walter J. Nill, Davison; Jean M. Buechler, Goodrich, both of Mich.

[73] Assignee: Delco Electronics Corporation, Kokomo, Ind.

[21] Appl. No.: 260,545

[22] Filed: Jun. 16, 1994

[51] Int. Cl.⁶ .................................................. G01C 22/00
[52] U.S. Cl. ........................ 235/95 R; 235/97; 235/91 PR
[58] Field of Search .................................... 235/95 R, 96, 235/97, 91 PR

[56] References Cited

U.S. PATENT DOCUMENTS

| | | | |
|---|---|---|---|
| 2,159,915 | 5/1939 | Van Wagenen | 235/95 R |
| 2,190,232 | 10/1959 | McCandless et al. | 235/97 |
| 3,227,366 | 1/1966 | Ullstad | 235/97 |
| 3,561,635 | 2/1971 | Henderson | 235/95 R |
| 3,583,629 | 6/1971 | Heidel | 235/96 |
| 3,962,986 | 6/1976 | Fujita et al. | 235/95 R |
| 4,354,097 | 10/1982 | Menager | 235/96 |
| 4,629,870 | 12/1986 | Lewis | 235/96 |

Primary Examiner—Russell E. Adams
Assistant Examiner—Eddie C. Lee
Attorney, Agent, or Firm—Jimmy L. Funke

[57] ABSTRACT

A vehicle trip odometer has a central shaft with both ends protruding for coupling of either end or both ends with other odometers. A total distance odometer likewise has both ends available for coupling to a trip odometer. Thus several arrangements of counter mechanisms are possible with a single design of trip and total odometers. Two trip odometers are serially driven by one end of the total odometer, or are each driven at opposite ends of the total odometer. A molded coupler connects shaft ends for joining adjacent odometers. Each shaft end has a flat for positive rotational drive of a coupler with a mating recess.

11 Claims, 1 Drawing Sheet

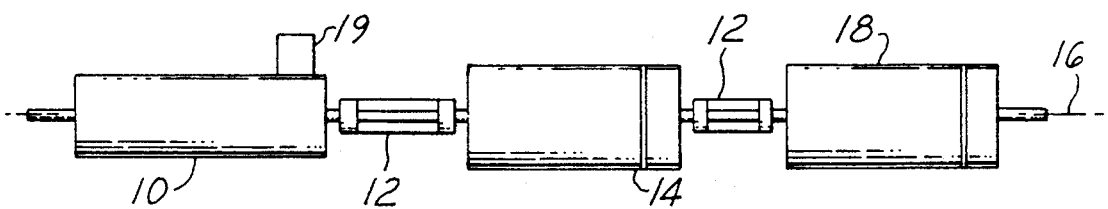
FIG. 1
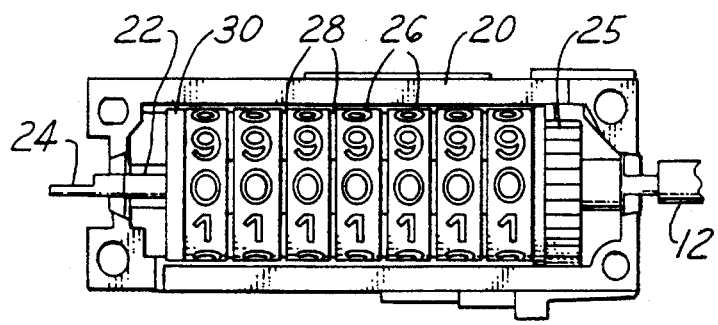
FIG. 2
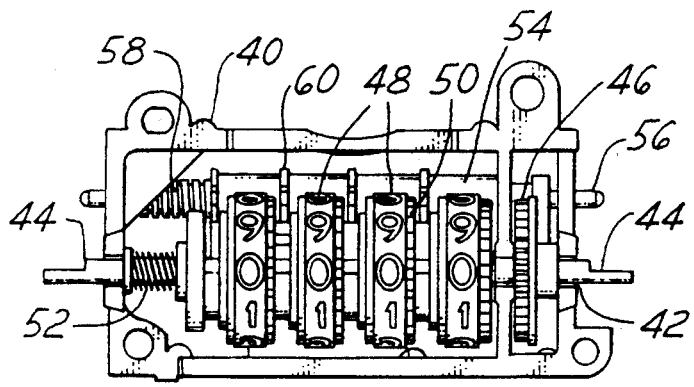
FIG. 3
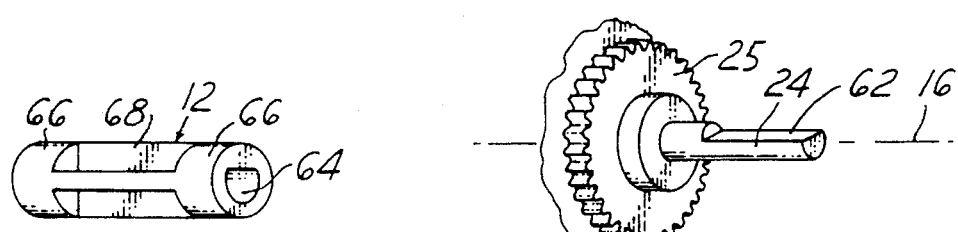
FIG. 5
FIG. 4
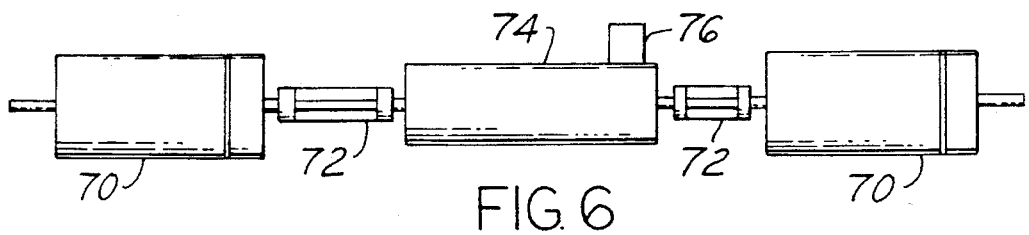
FIG. 6

5,464,970

MULTIPLE COUNTER ASSEMBLY

FIELD OF THE INVENTION

This invention relates to mechanical counters of the type used for vehicle odometers and particularly to the coupling of multiple counters in series.

BACKGROUND OF THE INVENTION

Mechanical counters are used in many applications, and often require more than one counter driven by the same input for registering events occurring in different time periods. For example, it is common practice in automotive vehicles to display total vehicle mileage on a main mechanical number wheel counter called a season or total distance odometer, and to display mileage for a short period on another mechanical counter, called a trip odometer, which is resettable at the beginning of the period. The total distance odometer is driven by a motor which is responsive to vehicle wheel rotation. A central shaft of the odometer rotates according to the motor input, and one end of the shaft extends outside the odometer frame to drive the trip odometer. Accordingly, the trip odometer has a central shaft with an outer end for attachment to the total distance odometer shaft. Then the motor input effectively drives both counters simultaneously. Where the trip odometer is to be placed on the left side of the total distance odometer, its exposed shaft end must be on the right side, and vice versa. The same consideration applies to the total distance odometer. Thus both counters are designed specifically for only left or right hand orientation of the trip odometer. A separate inventory of parts must be provided for the right and left hand configurations. In addition, only one trip odometer can be coupled to the total distance odometer.

SUMMARY OF THE INVENTION

It is therefore an object of the invention to use a single mechanical counter design for attachment to either side of another counter. Specifically it is an object of the invention to use a single trip odometer design for attachment to either side of a total distance odometer. Another object is to use a single total distance odometer design for attachment to either side of a trip odometer. Still another object is to serially couple three or more mechanical counters, for example a total distance odometer and two trip odometers.

The invention is carried out by constructing mechanical counters with a facility at both ends to drive another counter or to be driven by another counter. Number wheel odometers, whether total distance or trip meters, have a central shaft mounted for rotation in a frame. Both ends of each shaft extend beyond the frame for coupling to another odometer, the ends of adjacent shafts being joined by a coupler. Preferably the shaft ends are shaped for easy connection to the coupler and for torque transfer. A flat on the shaft end, resulting is a D-shaped cross section is a suitable shape. The coupler is a molded plastic element having a recess in each end shaped to mate with the shaft ends. The coupler length is chosen to space the meters a desired distance apart.

Several combinations of one or more trip odometers and a total distance odometer are possible when the trip odometers have driving ends on both ends of their central shaft. If the total distance odometer has only a single driving end on its central shaft, one or more trip odometers may be serially connected to it. A given trip odometer may, without alteration, be connected to either the right or left end of the total distance odometer. If the total distance odometer has driving ends on both ends of the shaft, a trip odometer may be connected to each end.

BRIEF DESCRIPTION OF THE DRAWINGS

The above and other advantages of the invention will become more apparent from the following description taken in conjunction with the accompanying drawings wherein like references refer to like parts and wherein:

FIG. 1 is a schematic illustration of an odometer assembly having a total distance odometer driving two trip odometers in series, according to one embodiment of the invention;

FIG. 2 is a front view of the total distance odometer of FIG. 1;

FIG. 3 is a front view of a trip odometer of FIG. 1;

FIG. 4 is an isometric view of a typical shaft end of the odometers of FIG. 1;

FIG. 5 is an isometric view of a coupler of FIG. 1; and

FIG. 6 is a schematic illustration of an odometer assembly according to another embodiment of the invention.

DESCRIPTION OF THE INVENTION

While the ensuing description is directed to a mechanical counter arrangement developed specifically for use as motor vehicle odometers, the invention is not limited to that application.

Referring to FIG. 1, a group of serially connected vehicle odometers comprise a total distance or season odometer 10 connected by a coupler 12 to one end of a first trip odometer 14, which in turn is connected at its other end by a coupler 12 to a second trip odometer 18. The odometers and the couplers preferably all lie on a common axis of rotation 16, although the odometers may be on different axes offset from one another with the couplers adjusting for the offset. A motor 19, responsive to vehicle wheel rotation, drives the total distance odometer 10, which then drives the trip odometers 14 and 18. The total distance odometer is set as zero at the time of manufacture and accumulates counts as vehicle mileage increases. The trip odometers can each be reset to zero at any time and accumulate counts simultaneously with the total distance odometer until they are reset again. Thus the trip odometers register distance traveled for relatively short time periods.

The total distance odometer 10 is shown in FIG. 2 and includes a frame 20, a central shaft 22 journaled in the frame on the common axis 16 with both ends 24 protruding outboard of the frame 20, a drive gear 25 press fit on the shaft 22 near one end, an array or stack of alternately disposed number wheels 26 and stationary disk-like pinion carriers 28 freely mounted on the shaft, and a relatively rotatable end wheel 30 at the end of the array opposite the drive gear 25. Pinions, not shown, carried by the pinion carriers 28 engage internal teeth on the number wheels and the drive gear, also not shown, to transfer rotation from the drive gear progressively along the stack of number wheels. Except for the shaft ends, the construction and operation of the total trip odometer 10 is well known and is commercially available, and to that extent further details need not be given here. The motor 19 is the input to the drive gear 25, the gear rotation causing count accumulation by the number wheels 26 and also causing rotation of the central shaft 22 for driving the trip odometers 14 and 18.

A trip odometer 14 is shown in FIG. 3 includes a frame 40, a central shaft 42 journaled in the frame with both ends 44 protruding outboard of the frame, a drive gear 46 press fit on the shaft 42 near one end, a plurality of number wheels 48 mounted for rotation on the shaft 42, each number wheel having an external gear 50 attached at one side. A spring 52 around the shaft 42 between one end of the frame 40 and the number wheels biases the number wheels 48 toward the right end of the frame 40. An indexing and reset mechanism 54 which is largely hidden behind the number wheels 48 includes pinions (not shown) on a carrier shaft 56 for transferring rotation from the drive gear 46 progressively along the array of number wheels 48 via the gears 50, a torsion spring 58 for maintaining engagement of the pinions with the gears 50, and a cam arrangement including reset fingers 60 for releasing the pinions from the gears 50 and resetting the number wheels to zero when manually operated. Like the total distance odometer 10, the trip odometer is well known and commercially available, apart from the shaft ends. The ends 44 are like the shaft ends 24 of the total distance odometer extending well beyond the frame and having a shape to positively drive a coupler or to be driven by a coupler.

FIG. 4 shows a typical shaft end 24 of the total distance odometer 10 (with the frame omitted) which is the same as the shaft ends of the trip odometers 14, and 18. The shaft end 24 protrudes from the drive gear 25 and the frame sufficiently to engage a coupler 12 to drive the adjacent odometer, and comprises a termination shaped for effective torque transfer to the coupler. The shaft end has a flat 62 on one side, resulting in a D-shaped cross section.

-The coupler 12, shown in FIG. 5, has a recess 64 in each end 66 shaped to mate with the shaft end 24 which affords a positive rotational drive connection. Other shaft end shapes suitable for torque transfer may be used. The outer surface of each end 66 is cylindrical, and the coupler body 68 between the ends 66 is cross shaped to afford a stable configuration which maintains alignment of the ends 66 during molding and thereafter. Each coupler 12 is the same except for length. The body length 68 is chosen to provide the desired separation of adjacent counters.

Since the trip counters 14 and 18 have drive ends on both ends of the unit, they can be serially coupled to the right end of the total distance odometer 10 as shown in FIG. 1 or on the left end, provided the total distance odometer has a drive end on the left end. In the preferred embodiment the total distance odometer 10, as shown in FIG. 2, has a drive end on both ends and thus has optimum versatility; in that case a single total distance odometer design can drive trip odometers on either end or both ends. FIG. 6 shows the example of one trip odometer 70 connected by couplers 72 to each end of a total distance odometer 74, which is driven by a motor 76.

The embodiments of the invention in which an exclusive property or privilege is claimed are defined as follows:

1. A mechanical counter assembly having a plurality of counters connected in series and an input driver responsive to events being counted, comprising:

first and second counters aligned on a common axis;

each counter including a central shaft on the common axis, number wheels mounted for rotation on the shaft and means for driving the number wheels;

the first counter having input means for rotation of the first counter shaft by the input driver;

identical drive means on both ends of one counter shaft and on at least one end of the other counter shaft, the drive means comprising a shaped termination of the shaft end;

and a coupler drivingly joining both shafts for joint rotation of the shafts, the coupler comprising an elongated member having an aperture on each end shaped to mate with the shaped termination of each shaft to provide for the transfer of torque between shafts.

2. The invention as defined in claim 1 further including a third counter having a central shaft on the common axis, and identical drive means on at least one end of said shaft of said third counter for coupling to one of the other counters.

3. The invention as defined in claim 1 further including a third counter having a central shaft on the common axis, and identical drive means on both ends of the third counter shaft for coupling via either end to one of the other counter shafts.

4. The invention as defined in claim 1 wherein the shaped termination of the shaft comprises an end portion of the shaft having a D-shaped cross section; and the apertures in the coupler are D-shaped to mate with the with the end portion on both shafts.

5. The invention defined in claim 1 wherein the drive means comprises a flat on the shaft; and the coupler comprises a molded polymer member configured to mate with the drive means.

6. A vehicle odometer assembly having a plurality of mechanical odometers connected in series comprising:

a total distance odometer and a first trip odometer;

each odometer including a central shaft;

a motor coupled to the total distance odometer for rotation of the total distance odometer shaft;

each end of the first trip odometer shaft and at least one end of the total distance odometer shaft having identically shaped terminations;

and a first coupler drivingly joining both shafts for concurrent operation of the odometers, the first coupler comprising an elongated member having an aperture at each end shaped to mate with the identically shaped termination on each shaft to provide for the transfer of torque between shafts.

7. The invention as defined in claim 6 including:

a second trip odometer having a central shaft on the common axis, the shaft having ends with the same identically shaped termination as on the ends of the first trip odometer shaft; and a second coupler drivingly joining the second trip odometer shaft to the first trip odometer shaft, the second coupler comprising an elongated member having an aperture on each end shaped to mate with the shaped termination of each shaft to provide for the transfer of torque between shafts.

8. The invention as defined in claim 6 further including:

a second trip odometer having a central shaft;

the total distance odometer shaft and the second trip odometer shaft each having ends with the same shaped terminations as on the ends of the second trip odometer shaft; and a second coupler drivingly joining the second trip odometer shaft to the total distance odometer shaft, the second coupler comprising an elongated member having an aperture on each end shaped to mate with the shaped termination of each shaft to provide for the transfer of torque between the shafts.

9. The invention as defined in claim 6 wherein the central shafts of the odometers lie on a common axis.

10. The invention as defined in claim 9 including:

a second trip odometer having a central shaft on the common axis, the shaft ends having the same shaped terminations as on the ends of the first trip odometer; and a second coupler drivingly joining the second trip odometer shaft to the first trip odometer shaft, the second coupler comprising an elongated member having an aperture on each end shaped to mate with the shaped termination of each shaft to provide for the transfer of torque between shafts.

11. The invention as defined in claim 9 further including:

a second trip odometer having a central shaft on the common axis;

the total distance odometer shaft and the second trip odometer shaft each having ends with the same shaped terminations as on the ends of the first trip odometer shaft; and a second coupler drivingly joining the second trip odometer shaft to the total distance odometer shaft, the second coupler comprising an elongated member having an aperture on each end shaped to mate with the shaped termination of each shaft to provide for the transfer of torque between shafts.

* * * * *